United States Patent

[11] 3,621,251

[72] Inventor Jack E. Slingluff
 5424 Peninsula Drive, N.W., Canton, Ohio 44718
[21] Appl. No. 816,663
[22] Filed Apr. 16, 1969
[45] Patented Nov. 16, 1971

[54] ELECTRONIC RADIOACTIVE SENSING AND SCANNING DEVICE
3 Claims, 3 Drawing Figs.

[52] U.S. Cl. .................................................. 250/71.5, 250/200
[51] Int. Cl. .................................................. G01t 1/20
[50] Field of Search ........................................ 250/71.5 S, 83.3 HP, 200

[56] References Cited
UNITED STATES PATENTS
3,370,172   2/1968   Hora ........................... 250/83.3

Primary Examiner—James W. Lawrence
Assistant Examiner—Davis L. Willis
Attorney—Frease & Bishop ABSTRACT: An observer's cathode-ray tube is provided with a cathode-ray beam generator connected to a circuit responsive to light produced on the surface of a radiosensitive light-producing member in response to the conjoint effect of radiation to be observed and a beam such as a cathode-ray beam, caused to sweep the surface of the radiosensitive light-producing unit. The circuit is so adjusted that the beam of the observer's cathode-ray tube is intense enough to produce a light spot on its screen only when the radiosensitive light-producing sheet is exposed to radiation to be observed. Sweep circuits are provided which are synchronized so that beams sweep the light-producing surface and the screen of the observer's cathode-ray tube in the same pattern. Consequently, the configuration of radiation reaching the radiosensitive, light-producing sheet is reproduced on the screen of the observer's cathode-ray tube and the observation may be made at a distance from the source of radiation to be observed.

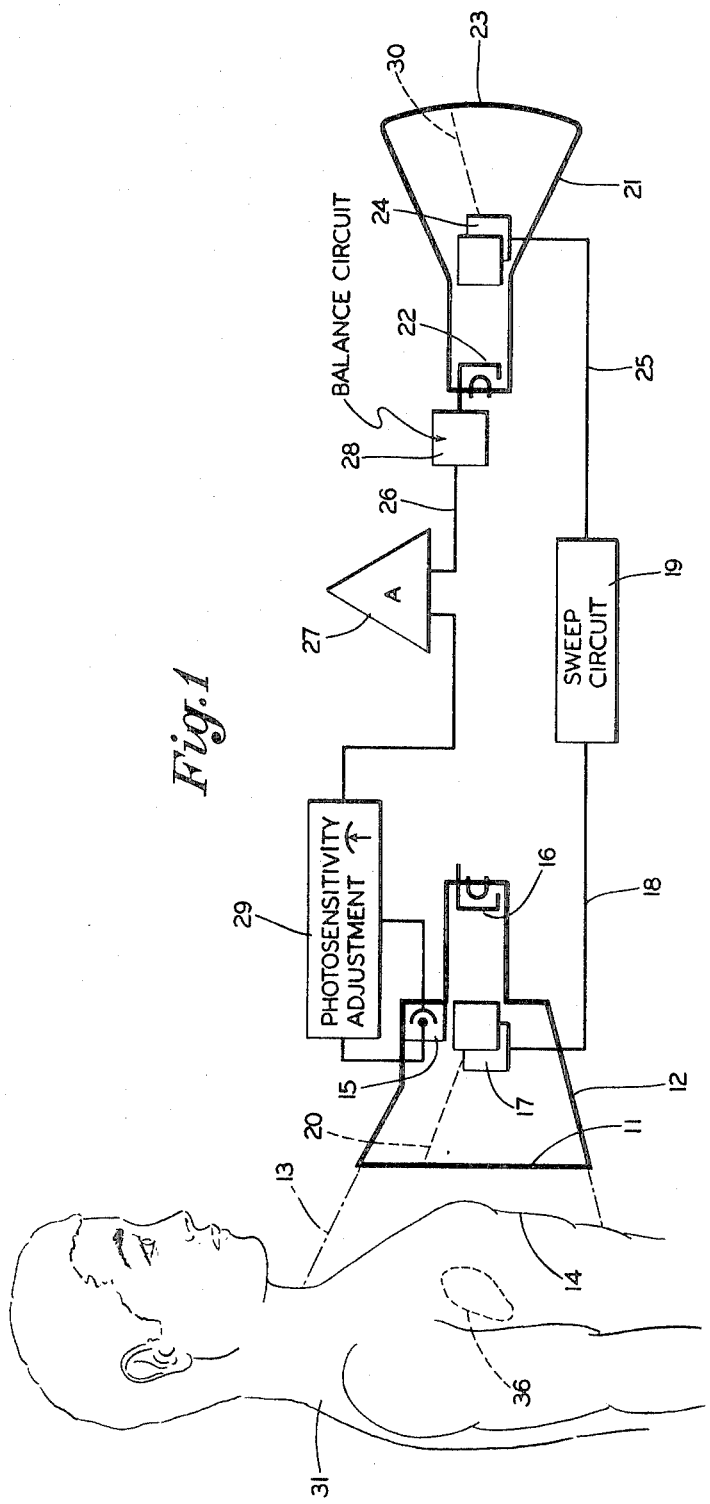
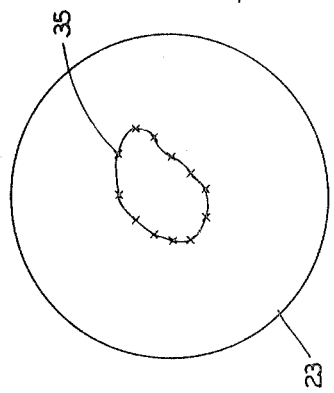
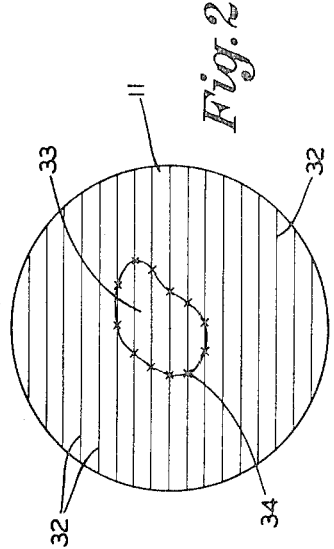
INVENTOR.
Jack E. Slingluff
BY
Frease & Bishop
ATTORNEYS

ELECTRONIC RADIOACTIVE SENSING AND SCANNING DEVICE

BACKGROUND OF THE INVENTION

1. Field of the Invention

The invention relates generally to the provision of a nonmechanical device for scanning radioactive materials. More specifically the invention is particularly related to and useful in connection with diagnostic procedures in observing the configuration, density, size, location, etc. of organs and other portions of the human body.

2. Description of the Prior Art

Radiation from such substances as radium and radioactive isotopes of various elements, and from Roentgen tubes or other sources of alpha, beta and gamma particles, in conjunction with a suitable device such as a phosphorescent screen to render the radiation visible, has been employed for various types of observations which cannot be made by the naked eye, particularly configurations of the interior of opaque substances. The use of such radiation has been employed, for example, in conjunction with nondestructive testing for interior flaws in metal structures, in crystallography for studying the nature and shape of crystals and identifying substances, and for diagnostic purposes by physicians to detect abnormalities, fractures, carcinoma and the like in the interior of the body and to determine their size and location. Frequently, however, it is advantageous to employ radiation of such intensity or radiated in such a direction that it is unsafe or inconvenient for the observer to be in close proximity to the object irradiated.

SUMMARY OF THE INVENTION

An object of my invention is to provide a system for enabling the configuration of radiation to be observed at a distance from the object irradiated.

In carrying out the invention in accordance with a preferred form thereof, a radiosensitive, light-producing crystal or phosphorescent screen is provided which may be mounted or placed in proximity to a source of radiation and an object which is to be irradiated and internally observed. The phosphorescent screen is provided with a lighttight enclosure so that no external light reaches the screen and illumination of the screen occurs only from radiation striking against the surface of the screen. A photosensitive device is mounted in the enclosure so that it can respond to illumination of points on the phosphorescent screen.

In order that the configuration of the illuminated portion of the phosphorescent screen may be observed, a cathode-ray tube is provided and means are provided for sweeping beams along the phosphorescent screen and the screen of the cathode-ray tube simultaneously at the same horizontal and vertical speeds. The beam sweeping the phosphorescent screen produces and additional effect thereon so as to produce a light spot of greater brilliance at portions of the screen struck both by the radiation to be observed and the sweeping beam. The apparatus thus employs the principle of light reenforcement produced on a radiosensitive light-producing member with an electron beam. The photosensitive device is so adjusted that it responds only when the brilliance is greater than that produced by either the sweeping beam or the radiation to be observed alone. The response is employed to energize the beam of the cathode-ray tube sufficiently to render it visible by producing a light spot on the screen of the cathode-ray tube. Accordingly, the trace of the light spots on the screen of the cathode-ray tube reproduce the configuration of the radiation to which the phosphorescent screen is subjected. These objectives, advantages and principles are used and obtained by the radioactive scanner construction hereinafter described in detail and claimed, which may be used effectively in diagnostic procedures concerning body organs, elements and functioning.

BRIEF DESCRIPTION OF THE DRAWINGS

A preferred embodiment of the invention—illustrative of the best mode in which applicant has contemplated applying the principles—is set forth in the following description and shown in the drawings and which is particularly and distinctly pointed out and set forth in the appended claims.

FIG. 1 is a schematic diagram of an embodiment of the invention representing the arrangement of parts of the apparatus;

FIG. 2 is a representation of the phosphorescent screen or radiosensitive light-producing sheet exposed to radiation, showing the scanning lines and the effect of radiation; and FIG. 3 is a representation of the screen of a cathode-ray tube illustrating the manner in which the radiation configuration is reproduced.

Like reference characters are utilized throughout the drawing to designate like parts.

In the embodiment of the invention illustrated there is a phosphorescent screen or the like constituting a radiosensitive light-producing sheet 11 adapted to be exposed to radiation to be observed. The screen 11 is mounted within a lighttight enclosure 12 so that no light can reach the interior surface of the screen 11. It will be understood that the screen 11 and enclosure 12 are arranged so as to be placed so close to an object to be observed that no external light can reach the screen 11 or when this is impracticable, a flexible external shield 13 is provided, which is adapted to abut a surface 14 of the object to be observed.

A suitable photosensitive device 15 such as a photoelectric tube or a photomultiplier tube, for example, is mounted within the lighttight enclosure 12. To produce a sweeping beam impinging on the interior surface of the phosphorescent screen 11, an electron gun 16 of the type employed, for example, in cathode-ray oscilloscopes is provided. Suitable beam deflecting means are also provided such as magnetic coils or, as illustrated schematically, pairs of electrostatic deflection plates 17 connected by means represented for convenience as a single line 18 to suitable conventional sawtooth wave generators or the like for horizontal and vertical sweeps, constituting a sweep circuit 19.

For reproducing the configuration of the radiation to which the phosphorescent screen 11 is exposed, a cathode-ray tube 21 is employed. The latter may be conventional in form and construction having a schematically indicated electron gun 22, a beam-sensitive screen 23, and beam deflecting means 24. The beam deflector 24 may be of any suitable type, but preferably takes the same form as the beam deflector 17. The beam deflector 24 of the cathode-ray tube 21, is also provided with a sweep circuit, which may be a common sweep circuit for the beam deflector 17, or one synchronized therewith. For convenience, the synchronization is represented by the common rectangle 19 connected to the beam deflector 24 by a suitable circuit represented by line 25. It will be understood that the beam-deflecting means 17 and 24 are designed to produce both horizontal and vertical sweep so that the entire effective areas of the phosphorescent screen 11 and the cathode-ray tube screen 23 are swept by the respective beams.

The output of the photosensitive device 15, in the form of an electrical voltage, is applied to the electron gun 22 of the cathode-ray tube 21, through a circuit represented by a line 26, preferably with an amplifier 27 interposed. The circuit is so adjusted that the beam 22 generates a voltage of sufficient intensity to illuminate the screen 23 whenever the portion of the screen 11 impinged by the beam from the gun 16 is exposed to external radiation. This may be accomplished by providing a balance circuit 28 which generates a threshold voltage just below that required to produce a spot on the screen 23 until a spot appears on the phosphorescent screen of the brilliance corresponding to the effect of both the radiation to which it is exposed, and the beam from the gun 16. The adjustment may also be made or supplemented by use of a photosensitivity adjustment circuit 29 for the photosensitive device 15. As is well known, the saturation and sensitivity of photoelectric tubes may be controlled by the magnitude of bias voltage employed. In the case of photosensitive devices of the multiplier tube type, a photosensitivity adjustment may be employed of the well-known type, such as described in U.S. Pat. Nos. 2,690,258 or 2,833,937 to Cox or 2,841,718 to Hoover.

The operation of the apparatus may be explained as used, for example, for diagnostic purposes in observing the configuration of an organ which has been caused to contain a radioactive isotope which has been introduced into the body 31 orally or intravenously and which has an affinity for a particular organ, for example, radioactive iodine in the case of the thyroid gland.

As illustrated in FIG. 2, the beam 20 produced by the beam generator 16 and swept by the pairs of deflection plates 17, controlled by the sweep circuit 19, traces a series of lines 32. These are actually quite closely spaced but are shown with wider spacing for simplicity in the drawing. Outside the area 33, these lines are not visible on the screen 23 because of the setting of the photosensitivity adjustment 29 and the balance circuit 28, which prevents the effect of the beam 20, produced by the gun 16 from being sufficient to produce an output in the circuit 26 which will activate the beam of the cathode-ray tube 21. However, within the area 33 of the screen 11, the screen 11 is exposed to additional radiation.

At the points on the screen 11, some of which are represented by X's 34, where the lines 32 of the sweep beam are superimposed on the radiation from the organ 36 within the body 31, the brilliance of the light produced on the screen 11, is of sufficient intensity to cause the photosensitive device 15 to cause generation of the beam 30 in the cathode-ray tube 21. Corresponding points, some of which are represented by the X's 35 in the FIG. 3 are produced on the screen 23 of the cathode-ray tube 21, to provide remote indication of the configuration of the radiation from the organ 36 in the body 31.

To some extend the brilliancy of the points 35 on the screen 23 represents the intensity of the radiation reaching corresponding points on the phosphorescent screen 11. The intensity of the radiation from an organ 36 containing radioactive substance within the body 31 will depend, both upon the distance from the source of radioactive particles and the density of any intervening structures such as bone structure. The radiation of greater intensity will produce greater output from the photosensitive device 15 and the amplifier 27 so as to increase the intensity of the beam of the cathode ray tube 21. In this manner the cluster of spots 35 on the screen 23 represents not only the configuration of the radiation reaching the phosphorescent screen 11 but also, within practical limits, variations in density of the detected radiation. The variation in brilliance in different portions of the representation on screen 23, resulting from different structural properties within the organ containing the radioactive particles or interposed denser materials between the organ 36 and the screen 11, thus aids the roentgenologist or physician in his diagnosis.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

I claim:

1. A radioactive scanner comprising in combination:
    A. A radiosensitive light-producing sheet adapted to be exposed to a source of radiation to be observed;
    B. A generator producing a beam which impinges on said sheet;
    C. A first device for sweeping said beam across said sheet;
    D. A cathode-ray tube having,
        a. a screen,
        b. an electron gun producing a beam impinging on said cathode-ray screen, and
        c. a second device synchronized with the first beam sweep device for sweeping the beam of the cathode-ray tube;
    E. A photosensitive device exposed to said light-producing sheet for producing an output dependent upon the brilliance of light on said sheet;
    F. An operative connection between said electron gun and said photosensitive device output for actuating the cathode-ray tube beam in response to light on said sheet whereby an image is formed on the cathode-ray screen conforming to the configuration of radiation to which said radiosensitive light-producing sheet is exposed;
    G. The beam impinging on said sheet producing a light spot thereon at the point of impingement; and
    H. Means for balancing the effect of said spot produced by impingement of the beam on the light-producing sheet, said balancing means comprising means to generate a threshold voltage just below that required to produce a spot on said cathode-ray screen until a spot appears on said sheet corresponding to the effect of both the radiation and the beam impinging on said sheet.

2. A radioactive scanner as described in claim 1 wherein the photosensitive device is adjusted electronically to produce a detectable voltage when the intensity of light produced on said radiosensitive sheet exceeds that resulting from the impingement of said beam on said sheet, and the electron gun on the cathode-ray tube is adjusted to produce a trace on the screen when the photosensitive device produces such detectable voltage, whereby an image is produced on the screen of the cathode-ray tube corresponding in configuration to the trace of the beam on the light-producing sheet during such times and in such areas as such sheet is exposed to the source of radiation to be observed.

3. A radioactive scanner as described in claim 2 wherein the photosensitive device is provided with a sensitivity adjustment circuit for setting the level of sensitivity required to respond to photoelectric effects exceeding those produced by the radiosensitive light-producing sheet.

* * * * *